US011335949B2

(12) United States Patent
Miara et al.

(10) Patent No.: US 11,335,949 B2
(45) Date of Patent: May 17, 2022

(54) BATTERY INCLUDING A SULFIDE BARRIER COATING

(71) Applicants: Samsung Electronics Co., Ltd., Suwan (KR); Massachusetts Institute of Technology, Cambridge, MA (US)

(72) Inventors: Lincoln J. Miara, Cambridge, MA (US); Naoki Suzuki, Osaka (JP); William D. Richards, Cambridge, MA (US); Yan E. Wang, Cambridge, MA (US); Jae Chul Kim, Cambridge, MA (US); Gerbrand Ceder, Orinda, CA (US)

(73) Assignees: SAMSUNG ELECTRONICS CO., LTD., Gyeonggi-Do (KR); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 133 days.

(21) Appl. No.: 16/720,210

(22) Filed: Dec. 19, 2019

(65) Prior Publication Data
US 2020/0144662 A1    May 7, 2020

Related U.S. Application Data

(62) Division of application No. 15/143,241, filed on Apr. 29, 2016, now Pat. No. 10,566,653.
(Continued)

(51) Int. Cl.
| H01M 10/0562 | (2010.01) |
| H01M 10/0525 | (2010.01) |
| H01M 10/052 | (2010.01) |

(52) U.S. Cl.
CPC ..... *H01M 10/0562* (2013.01); *H01M 10/052* (2013.01); *H01M 10/0525* (2013.01); *H01M 2300/0068* (2013.01); *Y02T 10/70* (2013.01)

(58) Field of Classification Search
CPC .. H01M 10/052; H01M 10/0562; H01M 4/13; H01M 4/134; H01M 4/136;
(Continued)

(56) References Cited

U.S. PATENT DOCUMENTS

| 5,314,765 | A |   | 5/1994  | Bates  |              |
| 5,589,298 | A | * | 12/1996 | Takada | H01G 9/155   |
|           |   |   |         |        | 429/220      |

(Continued)

FOREIGN PATENT DOCUMENTS

| CA | 2502438 A1 | 4/2004 |
| EP | 2234195 A1 | 9/2010 |

(Continued)

OTHER PUBLICATIONS

Hunting, Janet L, "The synthesis and structure of new transition metal lithium calcium nitride compounds", 2013, Elsevier, Journal of Solid State Chemistry 197, 288-296 (Year: 2013).*
(Continued)

*Primary Examiner* — Imran Akram
(74) *Attorney, Agent, or Firm* — Cantor Colburn LLP

(57) ABSTRACT

Provided is a lithium-conductive solid-state electrolyte material that comprises a sulfide compound of a composition that does not deviate substantially from a formula of $Li_9S_3N$. The compound's conductivity is greater than about $1\times10^{-7}$ S/cm at about 25° C. and is in contact with a negative electroactive material. Also provided is an electrochemical cell that includes an anode layer, a cathode layer, and the electrolyte layer between the anode and cathode layers. In an
(Continued)

example, the material's activation energy can be no greater than about 0.52 eV at about 25° C.

8 Claims, 4 Drawing Sheets

Related U.S. Application Data

(60) Provisional application No. 62/205,599, filed on Aug. 14, 2015.

(58) Field of Classification Search
CPC ...... H01M 4/1395; H01M 4/38; H01M 4/382; H01M 50/46; H01M 10/05
See application file for complete search history.

(56) References Cited

U.S. PATENT DOCUMENTS

| | | |
|---|---|---|
| 6,190,804 B1 | 2/2001 | Ishiko et al. |
| 6,214,061 B1 | 4/2001 | Visco |
| 9,711,798 B2 | 7/2017 | Son et al. |
| 2004/0072066 A1 | 4/2004 | Cho et al. |
| 2009/0162755 A1 | 6/2009 | Neudecker |
| 2012/0009484 A1 | 1/2012 | Aburatani et al. |
| 2013/0164627 A1 | 6/2013 | Waechter et al. |
| 2013/0298386 A1* | 11/2013 | Tarascon ............ H01M 4/13 29/623.1 |
| 2014/0178769 A1 | 6/2014 | Pirk et al. |
| 2014/0287305 A1 | 9/2014 | Wachsman et al. |
| 2014/0328724 A1 | 11/2014 | Chen |
| 2014/0363746 A1 | 12/2014 | He et al. |
| 2015/0044575 A1 | 2/2015 | Kawaji et al. |
| 2017/0358826 A1* | 12/2017 | Koh ............... H01M 10/0525 |

FOREIGN PATENT DOCUMENTS

| | | |
|---|---|---|
| JP | 7282796 A | 10/1995 |
| JP | 3259509 B2 | 2/2002 |
| JP | 2002513991 A | 5/2002 |
| KR | 100449765 B1 | 10/2002 |
| KR | 20150030156 A | 3/2015 |
| WO | 9957770 A1 | 11/1999 |
| WO | 2014141962 A1 | 9/2014 |

OTHER PUBLICATIONS

Marx, Rupert et al., Li9NS3: Das erste Nitridsulfid der Alkalimetalle in einer Li2O-Typ-Variante, Z. Anorg. Allg. Chem. (2006), 2151 (with machine translation).

* cited by examiner

- Nitrogen
- Sulfur
- Lithium
- Calcium
- Chlorine
- Vacancy $Li_9S_3N$ $Li_{8.75}Ca_{0.125}S_3N$ $Li_{8.875}S_{2.875}Cl_{0.125}N$

BATTERY INCLUDING A SULFIDE BARRIER COATING

CROSS-REFERENCE TO RELATED APPLICATIONS

This application is a divisional of U.S. patent application Ser. No. 15/143,241, filed on Apr. 29, 2016, which claims the benefit of U.S. Provisional Patent Application Ser. No. 62/205,599 to Miara et al., filed on Aug. 14, 2015, entitled "Sulfide Barrier Coating and Solid Electrolyte for Metal Anodes and all Solid State Batteries," the contents of which in their entirety are herein incorporated by reference.

BACKGROUND

There is tremendous excitement surrounding solid-state batteries, particularly lithium-based all-solid-state batteries, since they provide a path towards safe, energy dense, and long-life batteries. In particular, sulfide materials have received significant attention as solid electrolytes. However, there remain challenges for adoption such as high interfacial resistance with electrodes and a narrower electrochemical stability window compared to oxide materials. One way to deal with these challenges is to use a combination of materials to act as barrier layers and separators.

SUMMARY

An example of a battery embodiment includes a sulfide compound of a composition that does not deviate substantially from a formula of $Li_9S_3N$ and an anode material electrically coupled to the sulfide compound. The sulfide compound may have a conductivity greater than about $1\times10^{-7}$ S/cm at about 25° C. and may be in contact with a negative electroactive material. In some instances, the conductivity is greater than about $5\times10^{-7}$ S/cm at about 25° C. In alternative instances, the conductivity is greater than about $1\times10^{-6}$ S/cm.

The sulfide compound may be in contact with a negative electroactive material such as metallic lithium at a temperature lower than metallic lithium's melting temperature. Alternatively, the sulfide compound may be in contact with a lithiated anode material having a voltage within about 400 mV from metallic lithium's voltage. Upon contact with the metallic lithium or lithiated anode material, the sulfide compound may exhibit a conductivity of at least $1.0\times10^{-4}$ S/cm at a temperature of about 300K. The sulfide compound may be present in an anode barrier coating and/or in an electrolyte. The sulfide compound may be doped or undoped. For example, the sulfide compound may have a formula $Li_{9-2x-3y-z}A_xB_yS_{3-z}C_zN_3$, where $0\leq x<4.5$, $0\leq y<3$, and $0\leq z<3$. Optionally, the formula may be $Li_{9-2x-3y-z}A_xB_yS_{3-z}C_zN_3$, where $0.2\leq x<0.75$, $0.1\leq y<0.5$, and $0.25\leq z<1$, wherein A is selected from Ca, Zn, Mg, Cd, Sr, Ba and Be; B is selected from F, Cl, Br, and I, and C is selected from In, La, Be, Y, Sc, Ga and Al. The sulfide compound may have an activation energy no greater than about 1 eV to about 0.6 eV at about 25° C.

In another exemplary embodiment, an electrochemical cell may include an anode layer containing an anode material, a cathode layer containing a cathode material, and an electrolyte layer between the anode and cathode layers. A solid-state, alkali-ion conductive material is present in the cathode layer, the electrolyte layer, or both, the alkali-ion conductive material comprising a sulfide compound of a composition that does not deviate substantially from a formula of $Li_9S_3N$, having a conductivity greater than about $1\times10^{-7}$ S/cm at about 25° C. The cell may be a solid-state rechargeable cell.

In a further exemplary embodiment, a lithium-conductive solid-state electrolyte material may include a sulfide compound of a formula $Li_aS_bN_c$, having a conductivity greater than about $1\times10^{-7}$ S/cm and an activation energy no greater than about 0.52 eV at about 25° C., wherein, e.g., $8\leq a\leq 15$, $2\leq b\leq 4$, $0.5\leq c\leq 3$. The activation energy may be no greater than about 0.29 to 0.5 eV at about 25° C.

DETAILED DESCRIPTION

Figure 1:
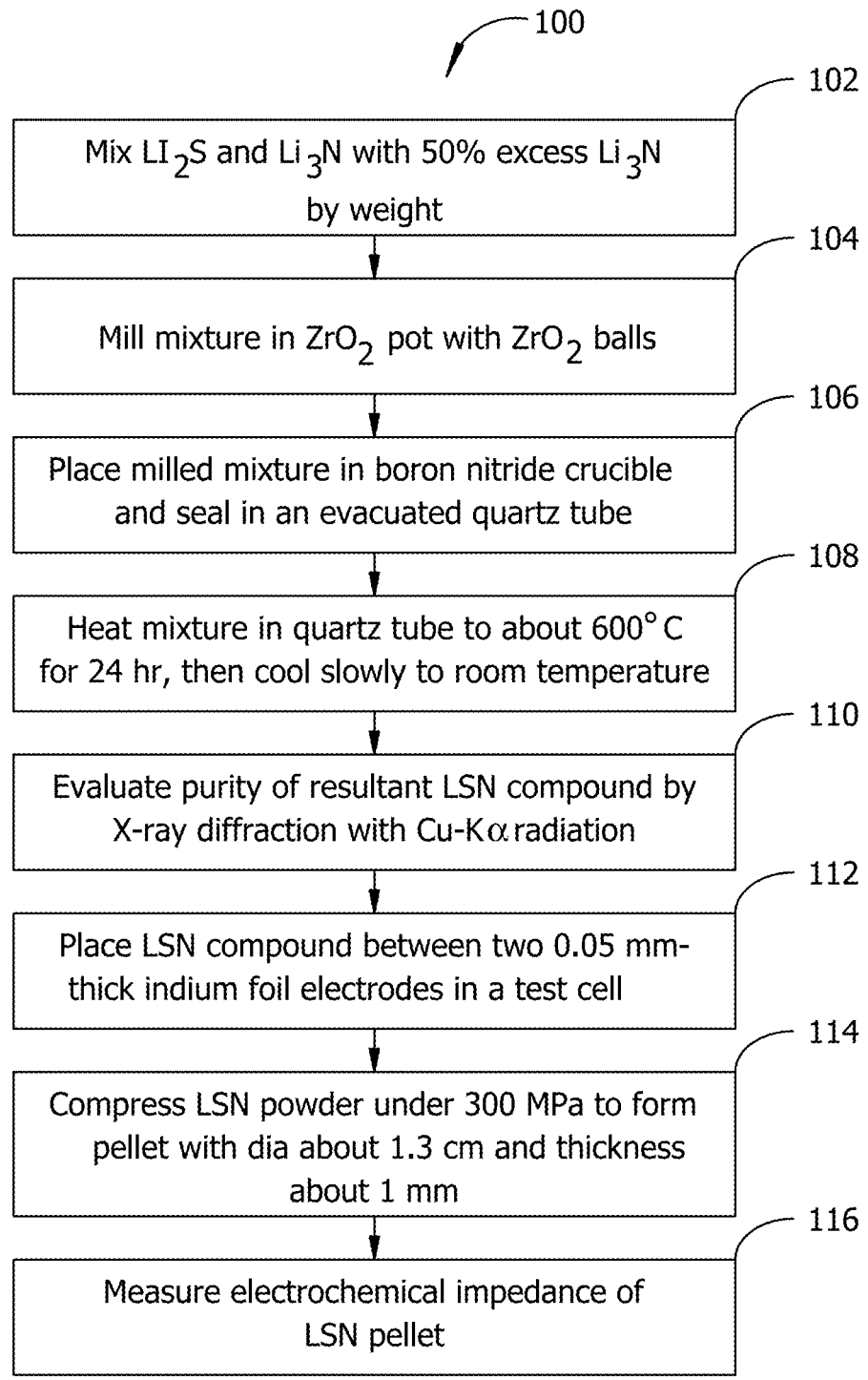
FIG. 1 illustrates an example of a method embodiment for synthesizing and characterizing an LSN compound in accord with a material embodiment.

Example embodiments described herein provide a battery that includes lithium-sulfur-nitrogen (LSN) material. For example, the battery can correspond to a solid-state or all-solid-state battery, and the LSN material can correspond to $Li_9S_3N$ material that serves an anode barrier coating, such as a Li-metal barrier coating. The coating can serve to protect an electrolyte from degradation due to contact with Li-metal. $Li_9S_3N$ is an interesting material for use as a Li-metal barrier coating in all solid-state batteries since this form of LSN is stable against reduction, has a higher conductivity than $Li_2S$, and has better stability than $Li_3N$.

In example embodiments, substituents can be added to $Li_9S_3N$. Substituents to a host LSN material tend to increase the conductivity of the host material. Exemplary substituents include Ca and Cl.

In an example embodiment, a barrier coating of $Li_3N$ may be formed by formed by reacting of $Cu_3N$ with Li metal in a reaction: $Li+Cu_3N\rightarrow Li_3N+Cu$. The coating formed may protect an electrolyte from degradation due to contact with Li-metal. It will be appreciated that alternative embodiments can omit the barrier coating.

As will be described in greater detail, an example embodiment can facilitate solid-state batteries. Additionally, if substituents such as Cl or Ca are used, the ionic conductivity can be improved compared to other barrier coatings, such as LiPON. Improved ionic conductivity may improve electrolyte performance.

In example embodiments, Ca-substituted $Li_9S_3N$ may be thermodynamically unfavorable. Accordingly, non-equilibrium methods of synthesis can be used. The electrochemical window of this material is small, set by the decomposition of $2Li_3N\rightarrow 6Li+N2$ which occurs around 0.44 V vs. Li metal. Thus, Ca-substituted $Li_9S_3N$ may be better suited to Li-metal barrier coatings than as a solid electrolyte in example embodiments. Ca-substituted LSN material may operate up to about 2.0 V compared to Li since $Li_2S$ may form a protective layer. An embodiment such as $Li_9S_3N$ may therefore be advantageous for use as an electrolyte in Li—S batteries or other low voltage cells.

Unless expressly indicated otherwise or indicated otherwise by context, the term "anode" is used interchangeably with the term "negative electrode," and the term "cathode" is used interchangeably with the term "positive electrode." The term "electrolyte" as in "solid-state electrolyte" unless expressly indicated otherwise or indicated otherwise by context, can refer to a material through which ions may, under an electric potential gradient, migrate by means of vacancies or interstitials within the material. A number of electrolytes exhibit high ionic conductivity and low electronic conductivity. The terms "substantial" and "substantially" can mean "of considerable importance" or "to a great or significant extent," but that trivial or insignificant counterexamples may be found, unless expressly indicated otherwise or indicated otherwise by context. For example, a "substantially solid" electrochemical cell may contain trace amounts of fluids like liquids or gases, but such fluids do not hinder or to a great degree negatively affect the performance of the electrochemical cell. Similarly, a "substantially solid-state" battery can correspond to a battery comprising entirely or consisting essentially of solid components, but that the battery does not have to exclude components that are entirely devoid of fluids as long as the operation of the battery is not hindered.

The term "solution" is used in its chemical sense and refers to one or more solutes in a solvent, unless expressly indicated otherwise or indicated otherwise by context. A solution may be fluid or solid in nature. For example, a solid-state solution differs from a solid-state compound in that the crystal structure of the solvent remains unchanged by addition of the solutes and that the solution may remain in a single homogeneous phase. As used herein, an electrically conductive material is a material that supports the transfer of electric charge, for example by mass transport of ionized particles, by electron transport, by hole transport, or by any one or more of these components of electric charge transfer, in any combination. Two materials are electrically coupled to one another when an electrically conductive pathway exists from one of the materials to the other.

Turning now to the figures, FIG. 1 illustrates an example of a method embodiment 100 for synthesizing and evaluating an LSN compound. A compound embodiment produced by the method of FIG. 1 may be suitable for use in a battery embodiment. Beginning at block 102, starting compounds $Li_2S$ (99.9% Alfa Aesar or equivalent) and $Li_3N$ (99.5% Strem Chemicals or equivalent) are mixed with 50% excess $Li_3N$ by weight. In block 104, the mixture may be mechanically milled for 1000 min at a rotating speed of 400 rpm using a planetary ball mill with a $ZrO_2$ pot and $ZrO_2$ balls. In block 106, the milled mixture may be placed in a boron nitride crucible and sealed in an evacuated quartz tube. In block 108, the mixture sealed in the quartz tube may be heated to about 600 Celsius for 24 hours in a muffle furnace and slowly cooled to room temperature. In block 110, the purity of the resultant LSN compound may be evaluated, for example by x-ray diffraction with Cu-Kα radiation.

Continuing with the example of FIG. 1, at block 112 a blocking electrode setup may be made by pressing the LSN powder from block 108 under about 300 MPa into a pellet of 1.3 cm diameter and ~1 mm thickness. At block 114 the LSN pellet from block 112 may be sandwiched between two approximately 0.05 mm thick indium foil electrodes and pressed under about 100 MPa. This assemblage may be put in a test cell in some embodiments having a stainless steel outer casing and a Teflon insulator. At block 116, the electrochemical impedance of the LSN compound may be measured, for example with an impedance spectrometer between approximately 1 MHz and 10 mHz.

Figure 2:
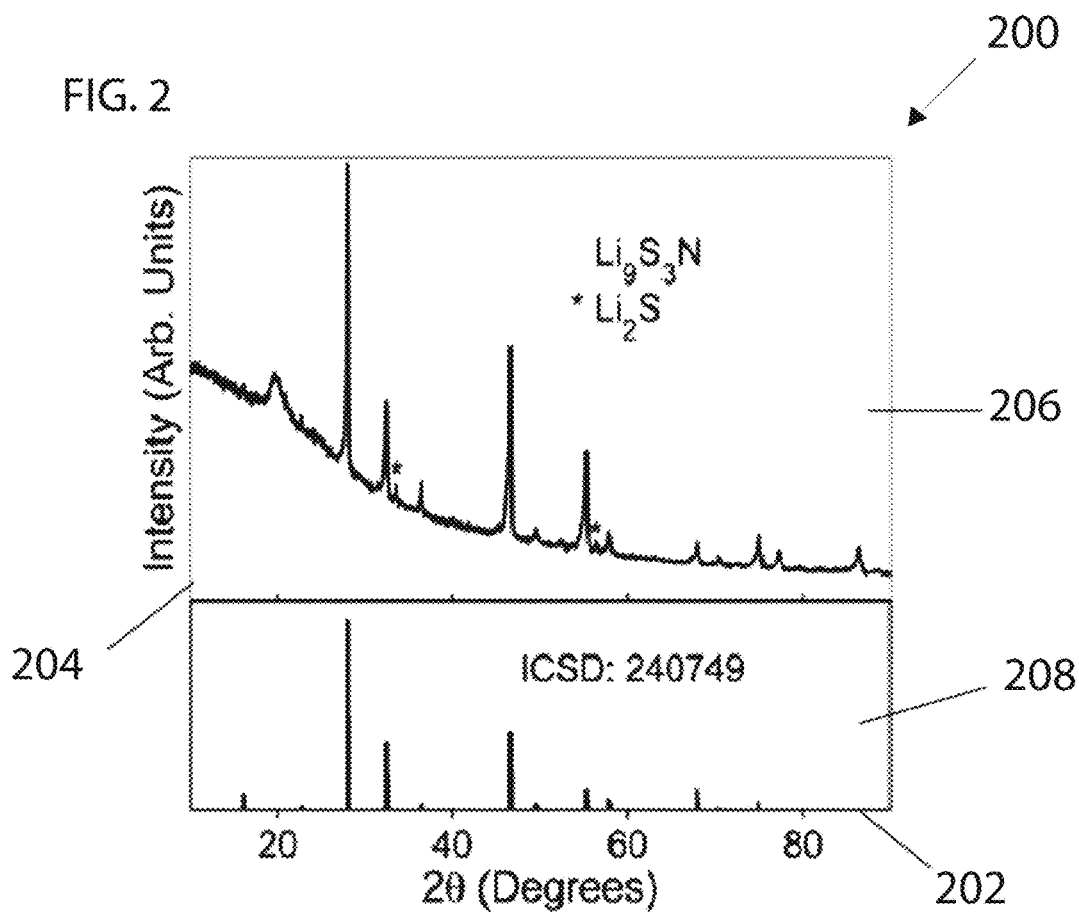
FIG. 2 is a graph that shows X-ray diffraction results, at 150% $Li_3N$, of an example of a material in accord with an embodiment.

FIG. 2 is a graph 200 that shows X-ray diffraction results, at 150% $Li_3N$, of an example of a material in accord with an embodiment. In particular, material corresponds to a sample of contain a mixture of $Li_9S_3N$ and $Li_2S$. The horizontal axis 202 of the graph represents a range of diffraction angles. The vertical axis 204 of the graph represents intensity of diffracted Cu-Kα radiation. The graph shows two plots 206, 208. The top plot 206 represents raw data. The bottom plot 208 represents the reference diffraction pattern of pure $Li_9S_3N$, as obtained from the Inorganic Structure Database (id #240749).

Figure 3:
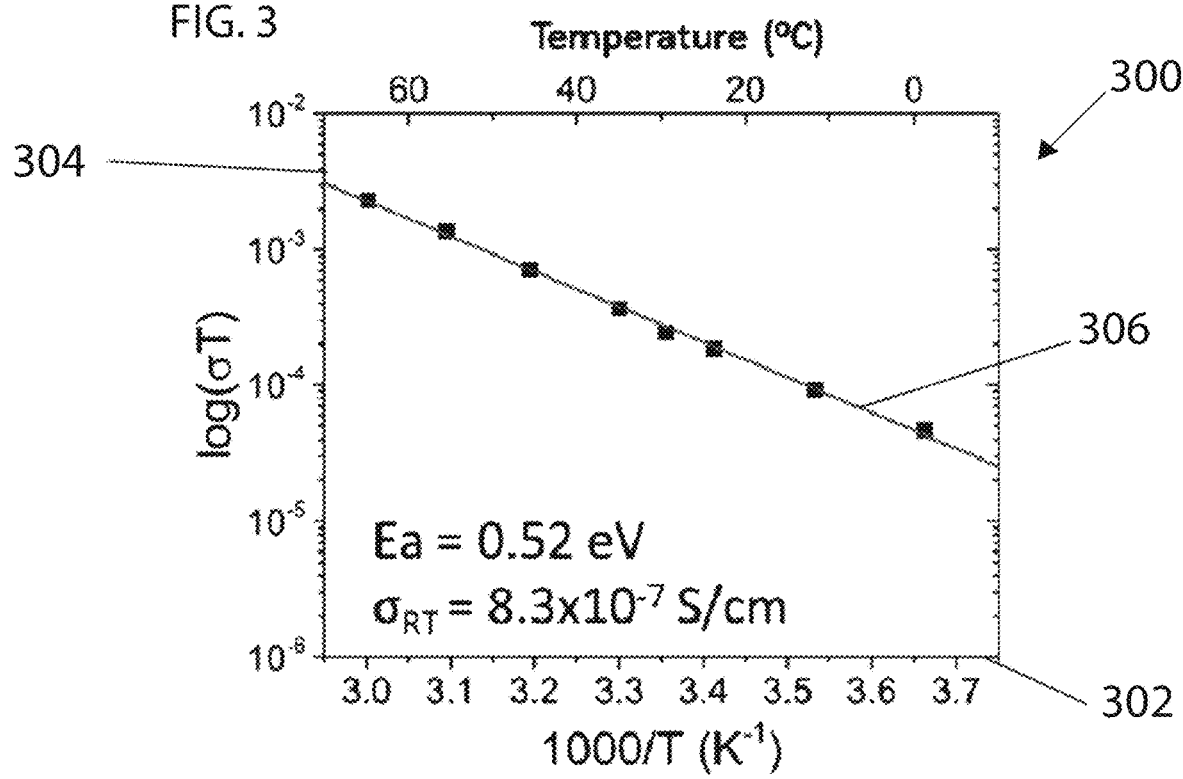
FIG. 3 is a graph that fits conductivity results of the exemplary material associated with FIG. 1 from electrochemical impedance spectroscopy.

FIG. 3 is a graph 300 that fits conductivity results of the exemplary material associated with FIG. 1 from electrochemical impedance spectroscopy. The horizontal axis 302 of the graph represents a range of temperatures. The vertical axis 304 of the graph represents a range of measured conductivities. The graph includes a plot 306. As depicted in FIG. 3, results show that the material is a nearly pure phase and has a conductivity of up to about $3.2 \times 10^{-6}$ S/cm at room temperature, the conductivity of the material measured at various temperatures. The material also exhibited an activation energy of about 0.52 eV. The purity and associated conductivity of the material renders the material suitable for use either as a barrier material or an electrolyte material depending on the required power and/or energy density of a particular electrochemical system (note, other levels of purity may be desirable or acceptable). For example, such an exemplary material may be used in solid lithium ion batteries associated with cell phones, tablet computers, power tools, electric automobiles, etc.

In order to improve conductivity, substitution energy of possible substituents was calculated with first principles based on density functional theory. Table 1 lists various doped LSN materials with their accompanying theoretical substitution energy.

TABLE 1

| Substituent (Kröger-Vink) | Chemical formula | $E_{substitute}$ (eV/substituent) | Volume (Å$^3$) | Density (gm/cc) |
|---|---|---|---|---|
| — | $Li_{72}S_{24}N_8$ | — | 1333.61 | 1.71 |
| $Cl_S^{\bullet}$ | $Li_{71}S_{23}N_8Cl$ | 0.115 | 1341.79 | 1.71 |
| $Br_S^{\bullet}$ | $Li_{71}S_{23}BrN_8$ | 0.330 | 1348.51 | 1.75 |
| $S_N^{\bullet}$ | $Li_{71}S_{25}N_7$ | 0.452 | 1365.32 | 1.69 |
| $I_S^{\bullet}$ | $Li_{71}S_{23}IN_8$ | 0.528 | 1356.85 | 1.80 |
| $Ca_{Li}^{\bullet}$ | $Li_{70}CaS_{24}N_8$ | 0.848 | 1358.04 | 1.72 |
| $Zn_{Li}^{\bullet}$ | $Li_{70}ZnS_{24}N_8$ | 0.908 | 1339.69 | 1.78 |
| $F_S^{\bullet}$ | $Li_{71}S_{23}N_8F$ | 0.974 | 1330.59 | 1.70 |
| $Mg_{Li}^{\bullet}$ | $Li_{70}MgS_{24}N_8$ | 0.985 | 1343.53 | 1.72 |
| $Br_N^{\bullet\bullet}$ | $Li_{70}S_{24}BrN_7$ | 1.188 | 1372.28 | 1.73 |
| $Cd_{Li}^{\bullet}$ | $Li_{70}CdS_{24}N_8$ | 1.254 | 1351.83 | 1.82 |
| $Sr_{Li}^{\bullet}$ | $Li_{70}SrS_{24}N_8$ | 1.501 | 1369.70 | 1.76 |
| $I_N^{\bullet\bullet}$ | $Li_{70}S_{24}IN_7$ | 1.681 | 1386.36 | 1.77 |
| $In_{Li}^{\bullet\bullet}$ | $Li_{69}InS_{24}N_8$ | 1.848 | 1347.53 | 1.82 |
| $La_{Li}^{\bullet\bullet}$ | $Li_{69}LaS_{24}N_8$ | 1.938 | 1363.72 | 1.83 |
| $Be_{Li}^{\bullet\bullet}$ | $Li_{70}BeS_{24}N_8$ | 2.299 | 1330.11 | 1.72 |
| $Ba_{Li}^{\bullet\bullet}$ | $Li_{70}BaS_{24}N_8$ | 2.363 | 1382.5 | 1.81 |
| $Y_{Li}^{\bullet\bullet}$ | $Li_{69}YS_{24}N_8$ | 2.415 | 1354.18 | 1.78 |
| $Sc_{Li}^{\bullet\bullet}$ | $Li_{69}ScS_{24}N_8$ | 2.668 | 1343.49 | 1.74 |
| $Ga_{Li}^{\bullet\bullet}$ | $Li_{69}GaS_{24}N_8$ | 2.858 | 1338.81 | 1.77 |
| $Ge_{Li}^{\bullet\bullet\bullet}$ | $Li_{68}GeS_{24}N_8$ | 3.057 | 1335.33 | 1.77 |
| $Al_{Li}^{\bullet\bullet}$ | $Li_{69}AlS_{24}N_8$ | 3.575 | 1334.96 | 1.73 |

Cl on the S site and Ca on the Li site are associated with the lowest substitution energy shown in Table 1. From first principles ab initio molecular dynamics (AIMD) calculations, Cl has a relatively modest effect on conductivity, whereas Ca has a relatively large improvement (See Table 2, below). Table 1 further indicates that Ca on Li has a substitution energy of about 0.848 eV/substitution.

TABLE 2

Summary of AIMD results for Ca and Cl substituted LSN.

|  |  | $E_a$ (eV) | $\sigma_{300}$ (S cm$^{-1}$) |
|---|---|---|---|
| $Li_9S_3N$ |  | 0.545 | $2.35 \times 10^{-6}$ |
| $Li_{9-x}S_{3-x}Cl_xN$ | x |  |  |
|  | 0.125 | 0.530 | $3.57 \times 10^{-6}$ |
|  | 0.250 | 0.486 | $1.18 \times 10^{-5}$ |
|  | 0.625 | 0.444 | $5.90 \times 10^{-5}$ |
| $Li_{9-2y}Ca_yS_3N$ | y |  |  |
|  | 0.125 | 0.409 | $7.76 \times 10^{-5}$ |
|  | 0.250 | 0.295 | $2.27 \times 10^{-3}$ |
|  | 0.625 | 0.268 | $9.64 \times 10^{-3}$ |

Therefore, the above data indicates that various forms of LSN, e.g., Ca— and Cl— substituted forms of $Li_9S_3N$ can serve as an effective Li-metal barrier coating. The above data also indicates that functional conductivity is achievable. With the addition of substituents, conductivity can be improved. For example, based on (predicted) performance with respect to ease of synthesis, stability, and high conductivity, the following compound may be synthesized: $Li_{9-2x-3y-z}A_xB_yS_{3-z}C_zN_3$, where $0.2<x<0.75$, $0.1<y<0.5$, and $0.25<z<1$. Thus, various forms of LSN may be may be used as an electrolyte in low voltage all or substantially all solid state batteries.

Figure 4:
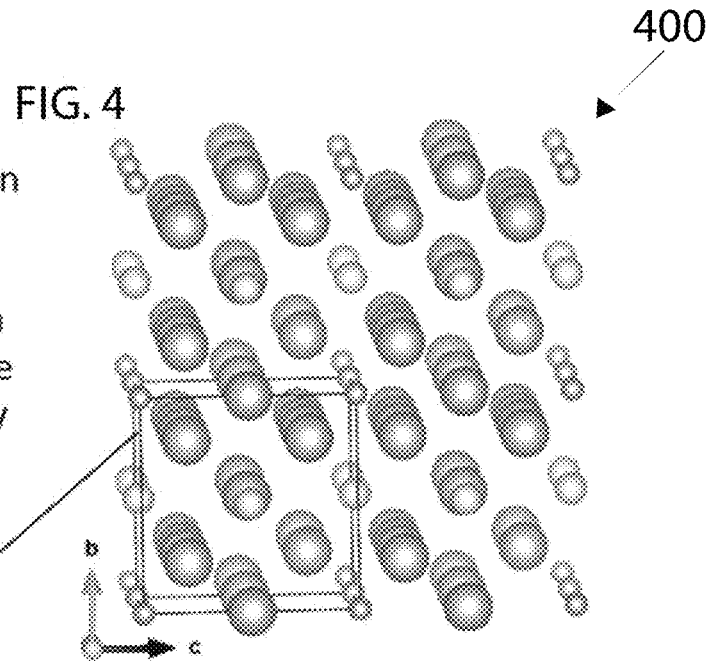
FIGS. 4-6 illustrate crystallographic unit cells of examples of alternative LSN material embodiments.

FIG. 4 shows the crystallographic structure 400 of undoped $Li_9S_3N$. The crystallographic structure 400 includes a unit cell 402. The unit cell 402 shown in FIG. 4 has a generally cubic lattice, forming anti-fluorite structure with face-centered cubic anion sublattice.

Figure 5:
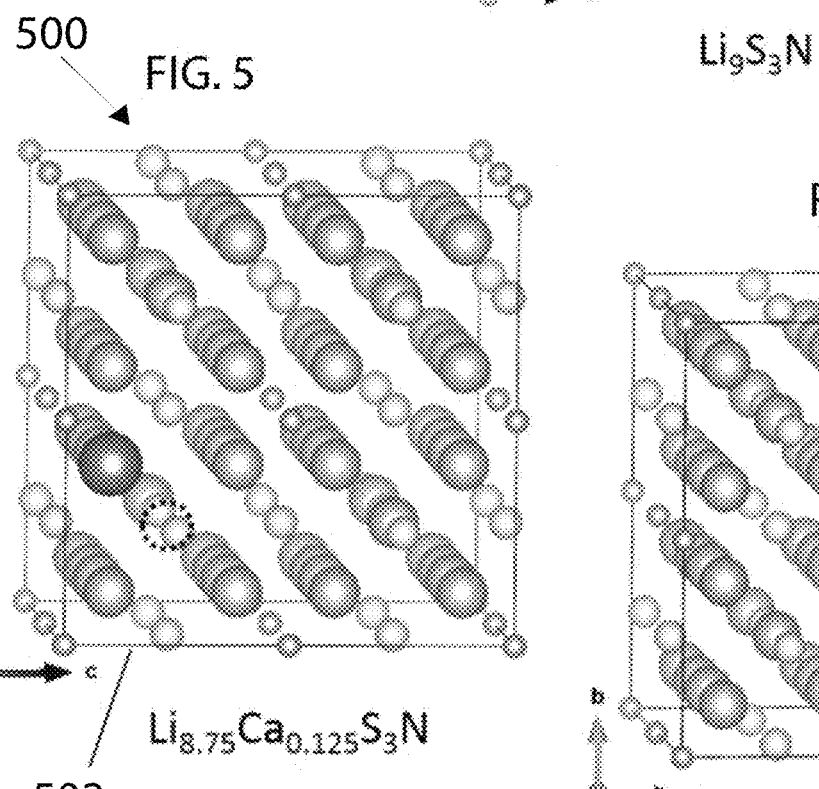
Figure 6:
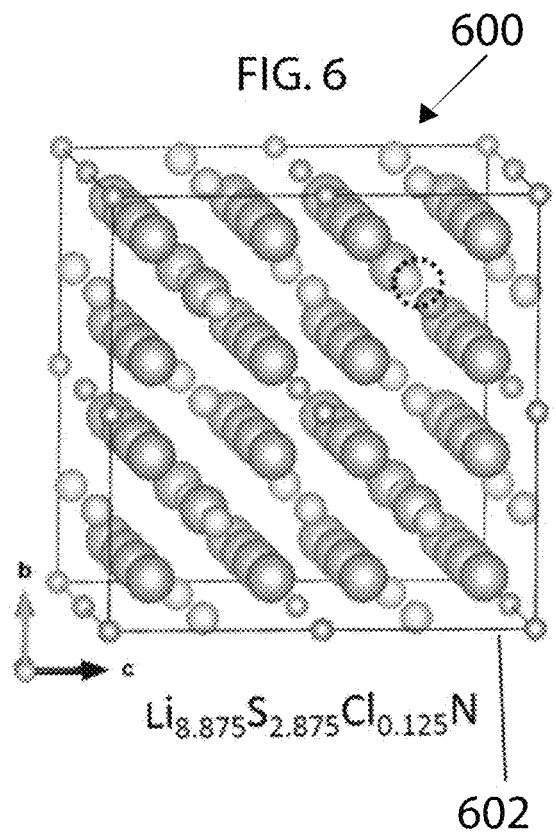

FIG. 5 shows the crystallographic structure 500 of Ca-doped $Li_9S_3N$. The crystallographic structure 500 includes a unit cell 502. The unit cell 502 shown in FIG. 5 has a generally cubic lattice structure type. Notably, the unit cell of the structure of FIG. 5 is defined slightly differently from the unit cell of FIG. 5 to account for Ca-doping FIG. 6 shows the crystallographic structure 600 of Cl-doped $Li_9S_3N$. The crystallographic structure 600 includes a unit cell 602. The unit cell 602 shown in FIG. 6 has a cubic lattice structure type. The unit cell of the structure of FIG. 6 is defined in substantially the same manner as the unit cell of FIG. 5 to account for the fat that Cl-doping may achieve a somewhat similar result as for Ca-doping from a crystallographic standpoint.

As shown, both Ca and Cl doping produce a lithium vacancy which resides close to the dopant. Presence of lithium vacancies in the doped $Li_9S_3N$ structures increases the ionic conductivity of such structures relative to that of the undoped structure.

Lattice parameter and crystallographic information for undoped $Li_9S_3N$ can be calculated from the diffraction peaks shown in FIG. 2.

Figure 7:
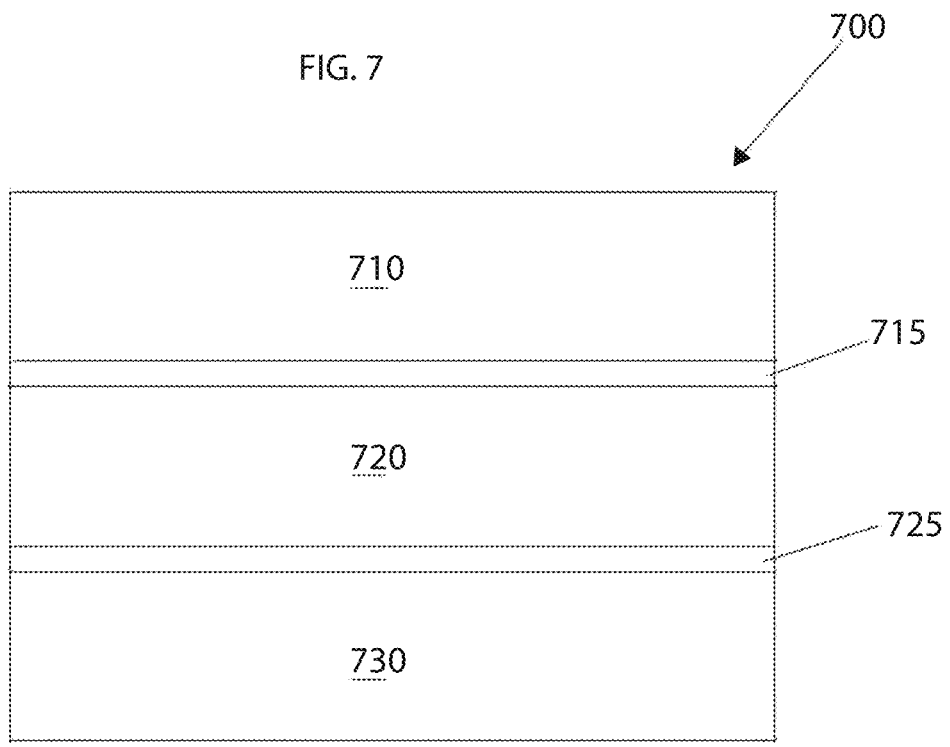
FIG. 7 schematically depicts an exemplary electrochemical cell embodiment.

FIG. 7 schematically depicts an exemplary electrochemical cell 700, in accordance with an embodiment. The electrochemical cell 700 includes an anode layer 710 containing an anode material, a cathode layer 730 containing a cathode material, and an electrolyte layer 720 between the anode and cathode layers. A first barrier layer 715 may be provided between the anode layer 710 and the electrolyte layer 720. The first barrier layer 715 can serve to ensure that the anode layer 710 and the electrolyte layer 720 do not react in an undesirable chemical manner. Similarly, a second barrier layer 725 may be provided between the cathode layer 730 and the electrolyte layer 720. The second barrier layer 725 can serve to avoid corrosion occurring between the cathode layer 730 and the electrolyte layer 720. It will be appreciated that one or more components of the cell 700 can be omitted in alternative embodiments. For example, the first and second barrier layers 715, 725 can be omitted.

When the anode layer 710 is metallic lithium, a solid-state Li-conductive material, for example, as described above, may be present in the cathode layer 730, the electrolyte layer 720, and/or one or more barrier layers 715, 725. The solid-state Li-conductive material may be present within the anode layer 710 if the anode layer 710 is formed from a lithium insertion material, e.g., $LiC_6$.

In some embodiments, the cell 700 may, for example, be a rechargeable solid-state cell. One or more cells may be included in the form of a primary or secondary battery, i.e., a single use or rechargeable battery. The battery may take any of a number of shapes, e.g., a coin shape, a laminate shape, a cylindrical shape and a rectangular shape, etc. The cell may also include an anode current collector electrically coupled with the anode layer and a cathode current collector electrically coupled with the cathode layer.

In an example embodiment, the electrolyte layer 720 contains the solid-state, Li-conductive material. The electrolyte layer 720 typically includes at least 10% to 100% by volume of the Li-conductive material. The electrolyte layer 720 may have a thickness of about 0.1 μm to 1000 μm. Optimally, the electrolyte layer thickness 720 may range from about 0.1 μm to 300 μm. The electrolyte layer 720 may be less than about 0.1 μm if a means for preventing shorting between the anode and cathode layers 710, 730 were provided. Such means may involve processing techniques associated with the electrolyte layer 720 or with the cell 700 as a whole to prevent dendritic growth of an electroactive metal like lithium.

The cathode layer 730 may include a cathode material, the solid electrolyte material, an electrically conductive material and a binder. Cathode active materials suitable for a solid-state lithium battery are typically highly Li-conductive and exhibit a relative high voltage against metallic lithium. In contrast, cathode materials may be ionically nonconductive but electronically conductive.

Microstructurally similar materials used in Li-ion electrochemical cells may be used in an embodiment. For example, $FeS_2$, $MnO_2$, spinel $LiMn_2O_4$, $LiCoO_2$, $LiNiO_2$ may serve as electroactive cathode materials. Examples of electrically conductive materials for use in the cathode include acetylene black and graphitic materials. The cathode active material layer may also contain a binder. Exemplary binders include fluorine-containing polymers such as polytetrafluoroethylene (PTFE) and polyvinylidene fluoride (PVDF). Examples of current collector materials for the cathode layer include aluminum, nickel, iron, titanium and carbon.

The anode layer 710 includes an anode material and optionally includes the solid electrolyte material, an electrically conductive material, and a binder material. Examples of the anode material include but are not limited to metallic lithium, a metal active material, and a carbon active material. Examples of the metal active material include In, Al, Si, and Sn. Examples of the carbon active material include mesocarbon microbeads (MCMB), high orientation property graphite (HOPG), hard carbon and soft carbon. The electrically conductive material and a binder used for the anode active material layer may be the same as or similar to those contained in the cathode layer. Exemplary anode current collector materials include copper, nickel and carbon.

It is to be understood that, the foregoing description merely illustrates and does not limit the scope of the embodiments described. Numerous alternatives and equivalents exist. For example, there are many different ways to synthesize embodiments of the Li-conductive materials. Alternatives to ball milling such as spray dispersion and other known techniques for mixing starting materials are possible as well. Other aspects, advantages, and modifications will be apparent to those skilled in the art to which the embodiments pertain.

We claim:

1. A battery comprising:
a cathode layer;
barrier layer comprising a sulfide compound comprising Ca-doped $Li_9S_3N$, Cl-doped $Li_9S_3N$, or a combination thereof;
an anode layer comprising an anode material and electrically coupled to the barrier layer; and
an electrolyte layer between the cathode and the barrier layer.

2. The battery of claim 1, wherein the sulfide compound is of the formula $Li_{9-x}S_{3-x}Cl_xN$, $Li_{9-y}Ca_yS_{3-y}N$, or a combination thereof, wherein x is 0.125 to 0.625 and y is 0.125 to 0.625.

3. The battery of claim 1, wherein the sulfide compound is $Li_{9-y}Ca_yS_{3-y}N$, wherein y is 0.125 to 0.625.

4. The battery of claim 3, wherein the sulfide compound has an activation energy no greater than about 0.6 eV at about 25° C.

5. The battery of claim 1, wherein the sulfide compound has an activation energy no greater than about 1 eV at about 25° C.

6. The battery of claim 1, wherein the sulfide compound has a conductivity of greater than about $1\times10^{-7}$ S/cm at about 25° C.

7. The battery of claim 1, wherein the electrolyte is a solid-state lithium-conductive electrolyte.

8. The battery of claim 1, wherein the sulfide compound is $Li_{9-x}S_{3-x}Cl_xN$ wherein x is 0.125 to 0.625.

* * * * *